United States Patent [19]

McGovern

[11] Patent Number: 4,661,378

[45] Date of Patent: Apr. 28, 1987

[54] PAVEMENT DRESSING CONDITIONER FORMED OF TAR, AN AROMATIC SOLVENT AND A BITUMINOUS PAVEMENT REJUVENATOR

[75] Inventor: Edward W. McGovern, Pittsburgh, Pa.

[73] Assignee: Koppers Company, Inc., Pittsburgh, Pa.

[21] Appl. No.: 757,895

[22] Filed: Jul. 23, 1985

[51] Int. Cl.$^4$ .............................................. B32B 35/00
[52] U.S. Cl. .................................. 427/140; 106/278; 106/285; 427/138; 427/393.6
[58] Field of Search ............ 427/138, 139, 140, 393.6; 106/278, 285

[56] References Cited

U.S. PATENT DOCUMENTS 3,221,615  12/1965  McGovern .......................... 106/285
3,261,269   7/1966  McGovern .......................... 427/138

Primary Examiner—Sadie L. Childs
Attorney, Agent, or Firm—Herbert J. Zeh, Jr.; Donald M. MacKay

[57] ABSTRACT

A novel composition for treating asphalt and concrete surfaces is provided formed of a mixture of topped coke oven tar, an aromatic solvent having an API Gravity@ 60° F. of 11–30, Specific Gravity 60°/60° F. of from 0.876–0.993, Distillation Range ° F. of 310–450 IBP (initial boiling point) to 350–550 DP (dry point), and a Flash pt. ° F. TCC of 110–250; and a bituminous pavement rejuvenator which is a composition derived from coal tar and comprises a mixture of di-, tri- and tetracyclic aromatic compounds and their alkyl homologs containing lower alkyl groups together with a significant amount of phenolic and hydroxy derivatives and having a specific gravity at 25°/25° C. of at least 1.08, an initial boiling point of at least 180° C., and a continuous boiling range to at least 300° C., 70–40% by volume of the material remaining as residue at 300° C., and the distillate to 300° C. having a minimum specific gravity at 25°/25° C. of about 1.025.

4 Claims, 1 Drawing Figure

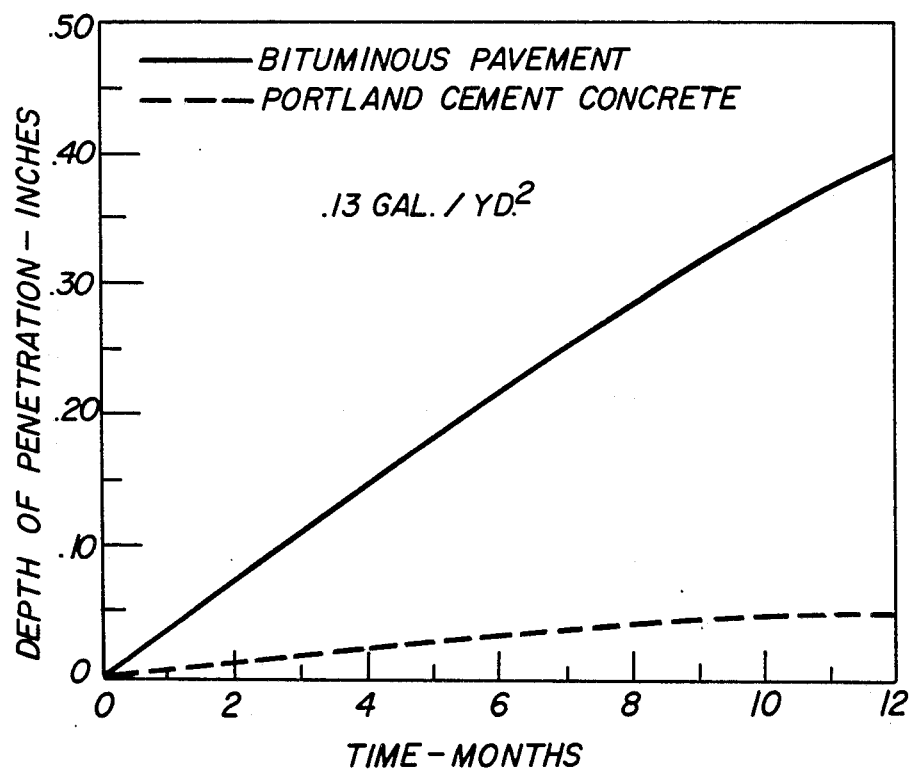

PAVEMENT DRESSING CONDITIONER FORMED OF TAR, AN AROMATIC SOLVENT AND A BITUMINOUS PAVEMENT REJUVENATOR

BACKGROUND OF THE INVENTION

This is an improvement on my pavement dressing conditioner described in U.S. Pat. No. 3,261,269 issued July 19, 1966.

BRIEF DESCRIPTION OF THE INVENTION

The invention relates to sealing, reconditioning and dressings for bituminous and concrete surfaces formed of a mixture of topped coke oven tar, an aromatic solvent preferably having as its major components trimethylbenzenes and ethyltoluenes and a bituminous pavement rejuvenator described in U.S. Pat. No. 3,221,615 issued Dec. 7, 1965 (herein incorporated by reference in its entirety) which rejuvenator is a composition which is derived from coal tar and comprises a mixture of di-, tri- and tetracyclic aromatic compounds and their alkyl homologs containing lower alkyl groups together with a significant amount of phenolic and hydroxy derivatives.

The novel composition is a low odor composition acceptable for use in suburban areas where odor has heretofore inhibited use. In addition the composition is more environmentally acceptable because of the elimination of coal tar heavy solvent naphtha.

BRIEF DESCRIPTION OF THE DRAWING

The drawing illustrates the depth that the composition will penetrate aged bituminous paving and Portland cement concrete pavement with the passage of time.

DETAILED DESCRIPTION OF THE INVENTION

Bituminous pavings are smooth, comfortable to ride upon and easily applied. Unfortunately, the smooth, even surface is not as lasting as would be desired. Bituminous pavements, for example asphalt roads, tend to harden, crack, ravel and generally deteriorate over a period of years until finally the road becomes unsatisfactory for further use. The phenomena is not completely understood. It is believed that the hardening of the asphalt roads may be caused by slow loss of volatile materials from the asphalt and by the oxidation of the asphalt itself. The deterioration proceeds at an increasing rate as the surface of the paving hardens, because it cracks thereby exposing more bituminous surface for oxidation. The cycle repeats; the cracks deepen. Factors such as the penetration of gasoline, kerosene and motor oil dropped from vehicles passing over the surface and also the penetration of water which, in colder climates, causes the pavement to crack due to the freeze-thaw cycle accelerate this deterioration.

Thus arises the need for economically prolonging the useful life of bituminous pavements and the need for economically repairing a badly cracked bituminous pavement.

Concrete surfaces are also subject to deterioration due to the freeze-thaw cycle because water can easily penetrate into the concrete through the small cracks and pores that naturally occur in concrete surfaces. Furthermore, chemicals which are placed on concrete to melt snow and ice accelerate the deterioration.

Seals of coal tar pitch emulsion or asphalt emulsions or slurries as heretofore known have afforded only temporary protection for the pavement surface and have had no beneficial effect on the pavement materials as little or no penetration into the paving material occurs. The seals have only capped the substrates. It has now been found in accordance with the invention that bituminous pavements which are in the process of becoming or have become dry and brittle through aging and weathering may be revitalized and protected by applying said sealer composition.

Surprisingly, it has also been found that the composition of the invention will penetrate concrete surfaces. Thus, the composition penetrates and seals the pores and small cracks in the concrete so that solvent, chemicals and water cannot enter even should a break occur in the surface coating. The degree of penetration into the concrete will depend upon the porosity of the concrete.

The novel composition of this invention contains from 40 to 60 percent by weight of a topped coke oven tar which is a topped, high temperature coke oven tar (a tar which has had from 5 to 25% of the lower boiling compounds removed by distillation) having a float test of 50–300 sec. at 50° C. The float test is a standard test defining the consistency of a topped coke oven tar (ASTM method D-139) with tar of this consistency being designated as RT-10, RT-11 and RT-12 and soft pitch.

The composition contains 20 to 35% by weight of an aromatic solvent with the following properties.

API Gravity @ 60° F. of from 11–30,
Specific Gravity @ 60/60° F. of from 0.876–0.993,
Distillation Range °F. of from 310–450 IBP (initial boiling point, ASTM: D86-62), to 350–550 DP (dry point, ASTM: D86-62), and a
Flash pt °F. TCC of from 110–250

Preferred aromatic solvents are the following Hi-Sol solvents sold by Ashland Oil & Refining Company. Hi-Sol 10 is the most preferred solvent.

| Product | AROMATIC SOLVENTS ||||||| 
| | API Gravity @ 60° F. | Specific Gravity 60/60° F. | Distillation Range °F. ||| Flash Pt. °F. TCC | KB Value | Mixed Aniline Pt. °F. |
| | | | IBP | 50% | DP | | | |
| --- | --- | --- | --- | --- | --- | --- | --- | --- |
| Hi-Sol TM 10 | 30.0 | .876 | 315 | 325 | 350 | 110 | 90 | 55 |
| Hi-Sol 15 | 28.0 | .887 | 360 | 371 | 400 | 145 | 90 | 61 |
| Hi-Sol 100P | 28.0 | .887 | 310 | 380 | 450 | 110 | 96 | 55 |
| Hi-Sol 4-1 | 15.4 | .963 | 400 | 443 | 490 | 170 | 100 | 55 |
| Hi-Sol 4-2 | 12.0 | .986 | 420 | 462 | 520 | 190 | 102 | 51 |
| Hi-Sol 4-2K | 17.4 | .950 | 400 | 462 | 550 | 195* | 112 | 84 |
| Hi-Sol 4-3 | 11.0 | .993 | 450 | 490 | 545 | 250* | 104 | 52 |

TM = trademark of Ashland Oil & Refining Company
*COC

The preferred solvent Hi-Sol 10 has as its principal components:

| | |
|---|---|
| 1,2,4-trimethylbenzene | 37.5% |
| m-ethyltoluene | 19.0 |
| 1,3,5-trimethylbenzene | 11.0 |
| 1,2,3-trimethylbenzene | 7.6 |
| p-ethyltoluene | 7.5 |
| o-ethyltoluene | 6.7 |

The composition also contains from 15 to 35 percent by weight of bituminous pavement rejuvenator.

Briefly the bituminous pavement rejuvenator is a blend of coal tar distillate fractions derived from high temperature coal tar and consists of high boiling, multicyclic aromatic compounds. The blend has a specific gravity at 25/25° C. of at least 1.08 and an initial boiling point of at least 180° C., a continuous boiling range to at least 300° C. with 70–40% of the material remaining as residue at 300° C. with a distillation curve to 300° C. of

| Temperature, °C.: | | Distillate |
|---|---|---|
| 180 | max | 1.0 |
| 190 | max | 2.0 |
| 200 | max | 3.0 |
| 210 | max | 4.0 |
| 220 | max | 5.0 |
| 230 | max | 6.0 |
| 240 | max | 10.0 |
| 250 | | 2–18 |
| 260 | | 5–30 |
| 270 | | 15–40 |
| 280 | | 20–45 |
| 290 | | 25–55 |
| 300 | | 30–60 | and said distillate to 300° C. having a minimum specific gravity at 25/25° C. of about 1.025. The aromatic compounds are di-, tri and tetracyclic hydrocarbons and their derivatives including a significant amount (from about 1 to 10%) of phenolic and hydroxy derivatives. The composition contains resinous materials which are the multicyclic condensation products of the di-, tri- and tetracyclic compounds formed when the compounds are subjected to high temperature distillation.

While the bituminous pavement rejuvenator may contain many aromatic compounds which boil above 180° C. the major components that a typical blend contains are listed in Table II along with the desired ranges in percent by weight in which each component should be present.

TABLE I

| Major components of bituminous pavement rejuvenator | |
|---|---|
| Compounds: | Percent by weight |
| Naphthalene | 1–5 |
| α-Methylnaphthalene | 1–10 |
| β-Methylnaphthalene | 1–15 |
| Dimethylnaphthalene | 1–20 |
| Acenaphthene | 1–10 |
| Fluorene | 2–20 |
| Phenanthrene | 2–20 |
| Anthracene | 2–10 |
| Carbazole | 1–5 |
| Fluoranthene | 1–5 |
| Pyrene | 1–5 |
| Crysene | 1–5 |
| Tar acids | 1–10 |
| Tar bases | 1–15 |

TABLE I-continued

| Major components of bituminous pavement rejuvenator | |
|---|---|
| Compounds: | Percent by weight |
| Resinous compounds | 1–10 |

The bituminous pavement rejuvenator includes a larger percentage of aromatic compounds having high solvent powers (e.g., alkyl-naphthalenes) than are normally found in a simple coal tar distillate having the same general boiling range. These solvent compounds are particularly compatible with the bituminous pavement materials and this gives the rejuvenator its excellent penetrating and plasticizing properties. At the same time the solvents prevent any crystals from forming in the rejuvenator due to supersaturation of the solutions with any of its components.

The presence of the tar acids (phenolic and hydroxyl derivatives) acts to plasticize the brittle oxidized asphalt by dissolving the oxidation products therein. These tar acids include for example xylenols, naphthols, p-phenyl phenol, hydroxyphenanthrene, etc.

In the case of bituminous surfaces, the novel pavement dressing conditioner is believed to rejuvenate or prolong the useful life of the bituminous pavements by plasticizing the binder. The novel composition, however, protects both bituminous and concrete surfaces from the deteriorative effects of solvents, chemicals and water by effectively sealing the surface to prevent their penetration into the pavement. The novel composition of this invention is a liquid which can be applied at ambient temperatures (30°–120° F.), dries quickly and provides rapid and effective penetration into the surface of the pavement. It will also provide water-tight seals for concrete pipe.

The novel composition is preferably applied in the amount of about 0.05 to 0.5 gallon per square yard. Less than 0.05 gallon per square yard seems to be insufficient to adequately seal and rejuvenate the pavement and more than 0.5 gallon per square yard may even cause bituminous pavements to become unstable. Conventional methods of handling liquid bituminous material can be used in applying the composition such as spraying through a bituminous distributor or painting with a brush or roller, or squeegee.

After the novel composition is applied to paving, it is permitted to set for a short period, for example, a half hour. Then, the surface is brushed with a stiff broom to remove any excess composition from low areas and deposit it in the cracks. Thereafter the paving is ready for the movement of rubber tired vehicles thereover. With time, the composition plasticizes old bituminous pavement and softens the material in the vicinity of the cracks to the extent that rubber tired traffic will close the cracks. In areas such as airports where the vehicular traffic may be small, it is desirable to roll the treated paving with a rubber tired roller.

The novel composition of this invention continues to penetrate into the surface for a substantial period of time. The extent of penetration may be readily determined visually since the portion which has been penetrated by the novel composition has a color that is darker than that of the original pavement. This penetration is a direct function of the length of time after application. The drawing shows, for example, the depth of penetration in inches of asphalt and concrete paving as a function of time, the determinations having been made by drilling a core from the pavement at various intervals of time.

The extent of plasticizing of the aged bituminous pavement can be conveniently illustrated by the use of the characteristic of a bituminous paving material such as penetration. Penetration (ASTM D5-25) is determined by measuring the distance in tenths of a millimeter that a needle penetrates into the asphalt under controlled conditions. An asphalt paving was tested as to penetration after the addition of the novel sealing and rejuvenating composition of this invention to the paving at a rate of 0.07 gallon per square yard. The results of the tests are illustrated in Table II as compared to an untreated sample.

TABLE II

| Penetration at 77° F. | |
|---|---|
| Treated | Untreated |
| 43 | 26 |

A typical pavement dressing conditioner of this invention can be prepared by mixing the components in a conventional mixing tank in the manner of Example I.

EXAMPLE 1

Topped coke oven tar (75-100 seconds float test at 50° C., 46.0 parts by weight) at a temperature of 200°-220° F. was added to a mixing tank equipped with recirculation. To the tank was then added at a temperature of 150° F., 24 percent by weight bituminous pavement rejuvenator. The mixture was recirculated and then at ambient temperature 30 percent by weight of Hi-Sol 10 was added. When homogenous, the mixture was allowed to stand at ambient temperature.

The specifications for the sealing, dressing and rejuvenating compositions of this invention are as follows:

| Test Method | Characteristic | |
|---|---|---|
| ASTM D-3142 | Sp. Gravity, 25/25° C. | 1.06 min. |
| D-1665 | Engler Specific Viscosity, 50 cc. at 50° C. | 2.5 max. |
| D-95 | Water | 2.0 max. Percent by Weight |
| D-20 | Distillation to: | |
| | 170° C. | 5.0 max. |
| | 270° C. | 25-45 |
| | 300° C. | 35-55 |
| D-36 | Softening point, residue above 300° C. (Ring and Ball). | 30-55° C. |

It is believed that if it were possible to segregate the action of the components that the tar portion of the novel composition provides a solvent and water-tight seal for the substrate, while the bituminous pavement rejuvenator portion revitalizes the aged bituminous paving substrate by replacing volatile materials and by plasticizing the binder thereby preventing further cracking of the pavement and healing existing cracks and fissures. The solvent portion not only provides a compatible vehicle for the other two components but, more importantly, permits the composition to be used for applications, heretofore, unacceptable because of odor and and also permits it to be applied at ambient temperatures (30°-120° F.) and promotes rapid penetration of the composition into the substrate. The solvent portion also promotes drying of the surface. These actions occur conjointly and the action of one mutually affects the action of the other so that separation of the effects is not possible.

The composition can be mixed with sand, pozzolana or other fine mineral aggregates prior to application where due to heavy traffic, a coating having more body is desired.

In treating bituminous and concrete paving, the composition is applied to the paving advantageously by spraying at a rate, for example, of 0.1 gallon per square yard. The composition is permitted to soak for 15 minutes to one-half hour and thereafter distributed further over the surface and into the cracks by brushing with a stiff broom. The drying time of the material will vary between 30 minutes to 12 hours depending upon the type of pavement, condition of the pavement and climatic conditions. When traffic is to proceed immediately over the paving, it is desirable to sprinkle the paving with sand so as to minimize pickup of the rejuvenating composition on the tires of the cars. The composition effectively seals concrete and bituminous surfaces against fuel, oil, water and ice removing chemicals.

If the traffic is not heavy, it is advantageous to roll bituminous paving at the end of 60 days with a roller having rubber tires. The rejuvenator restores the cold flow properties of bituminous pavement and its flexibility so that it behaves in the manner of a new pavement.

The composition can be used to rejuvenate old bituminous pavements and seal them against further deterioration as well as sealing bituminous or concrete surfaces which have not begun to deteriorate but due to age, use or climatic conditions will be suspected to soon deteriorate unless an effective sealing compound is applied.

In the sealing of the surface of concrete pipe the composition can be applied to either the inner or outer surfaces of the pipe by sprayer, brush or roller. A satisfactory rate of application would be, for example, 0.1 gallon per square yard. The composition prevents the seepage of liquids through the pipe wall and thus provides an effectively sealed conduit. It also prevents the passage of moisture into the pipe wall, which, in cold climates would freeze and crack the pipe.

The foregoing specification has described novel compositions and methods of rejuvenating asphalt pavements, sealing and dressing asphalt and concrete pavements and providing a water-tight seal for porous material such as concrete pipe. It is particularly advantageous for use on airport runways, taxiways and parking strips to rejuvenate old bituminous pavements and to provide an effective seal against the effects of gasoline, JP-4 fuel and motor oil. It is also advantageous for use on city streets where decreasing curb heights inhibit the use of additional pavement overlays unless new curbs are placed or unless the present pavement is removed to some depth in order to provide effective drainage. It is also advantageous for use on concrete pavements where in cold climates the effect of penetration by water and the resulting freeze-thaw cycles and the placing of ice and snow removal chemicals on the surface causes rapid deterioration unless some protective layer is applied. The composition can be applied at ambient temperatures which eliminates the necessity for heating the composition prior to application with its attendant unfavorable economic aspect and problems due to fumes which can have adverse effects on the personnel applying the coating. The solvent system provides a quick drying surface and permits the rejuvenating and sealing compound to rapidly penetrate the pavement to an effective depth.

Other applications of the novel composition include the pretreatment of cracked pavements prior to overlaying with new bituminous courses so that the cracks in the old pavement will not be reflected up to the new overlay. It can be used to pretreat pavement surfaces after planing operations with a conventional heater planer or to pretreat pavement prior to heating with conventional infrared equipment used for healing cracks.

What is claimed is:

1. A sealing and rejuvenating composition for bituminous and concrete surfaces comprising 40–60% by weight of topped coke oven tar having a float test of 50–300 seconds at 50° C., 20–35% by weight of an aromatic solvent having API Gravity at 60° F. of from 11–30, Specific Gravity 60/60° F. of from 0.876–0.993, IBP (initial boiling point) between 310 and 450, DP (dye point) of between 350 and 550, and a Flash pt. °F. TCC of from 110–250, and 15–35% by weight of a mixture of di-, tri- and tetracyclic aromatic compounds and their alkyl homologs containing lower alkyl groups together with 1–10% by weight of phenolic and hydroxy derivatives, said mixture being derived from the distillation of coal tar, said mixture having a specific gravity of 25/25° C. of at least 1.08 and an initial boiling point of at least 180° C., a continuous boiling range to at least 300° C., with a distillation curve to 300° C., 70–40% of the material remaining as residue at 300° C., the distillate at 300° C. having a minimum specific gravity at 25/25° C. of about 1.025.

2. The composition of claim 1 wherein the aromatic solvent comprises as its major components trimethylbenzenes and ethyltoluenes.

3. A method of sealing and rejuvenating bituminous and concrete surfaces which comprises applying to the surface at a rate of 0.05–0.5 gallon per square yard a composition comprising 40–60% by weight of topped coke oven tar having a float test of 50–300 seconds at 50° C., 20–35% by weight of an aromatic solvent having API Gravity at 60° F. of from 11–30, Specific Gravity 60/60° F. of from 876–993, IBP (initial boiling point) between 310 and 450, DP (dry point) of between 350 and 550, and a Flash pt. °F. TCC of from 110–250, and 15–35% by weight of a mixture of di-, tri- and tetracyclic aromatic compounds and their alkyl homologs containing lower alkyl groups together with 1–10% by weight of phenolic and hydroxy derivatives, said mixture being derived from the distillation of coal tar, said mixture having a specific gravity of 25/25° C. of at least 1.08 and an initial boiling point of at least 180° C., a continuous boiling range to at least 300° C., 70–40% of the material remaining as residue at 300° C., with a distillation curve to 300° C., the distillate at 300° C. having a minimum specific gravity at 25/25° C. of about 1.025.

4. The method of claim 3 wherein the aromatic solvent comprises as its major components trimethylbenzenes and ethyltoluenes.

* * * * *

UNITED STATES PATENT AND TRADEMARK OFFICE
CERTIFICATE OF CORRECTION

PATENT NO. : B1 4,661,378
DATED : January 18, 1994
INVENTOR(S) : Edward W. McGovern It is certified that error appears in the above-indentified patent and that said Letters Patent is hereby corrected as shown below:

On the Title Page, Item [57], line 5, "0.993." should read --0.993,--.
Claim 1, column 1, line 30, "0.933" should read --0.993--.
Claim 1, column 1, line 33, "°F.TCC" should read --°F. TCC--.
Claim 5, column 2, line 17, "boil" should read --boiling--.
Claim 6, column 2, line 26, after "50° C." insert --,--.

Signed and Sealed this

Twelfth Day of July, 1994

BRUCE LEHMAN

Attest:

Attesting Officer            Commissioner of Patents and Trademarks

REEXAMINATION CERTIFICATE (2191st)
United States Patent [19]
McGovern

[11] B1 4,661,378
[45] Certificate Issued  Jan. 18, 1994

[54] PAVEMENT DRESSING CONDITIONER FORMED OF TAR, AN AROMATIC SOLVENT AND A BITUMINOUS PAVEMENT REJUVENATOR

[75] Inventor: Edward W. McGovern, Pittsburgh, Pa.

[73] Assignee: K. A. E. Paving Consultants, Inc., Pittsburgh, Pa.

Reexamination Request:
No. 90/002,855, Oct. 8, 1992

Reexamination Certificate for:
Patent No.: 4,661,378
Issued: Apr. 28, 1987
Appl. No.: 757,895
Filed: Jul. 23, 1985

[51] Int. Cl.$^5$ ............................................. B32B 35/00
[52] U.S. Cl. ................................. 427/140; 106/278; 106/285; 427/138; 427/393.6
[58] Field of Search ............. 427/138, 139, 140, 393.6, 427/136, 417, 443; 106/278, 285

[56] References Cited

U.S. PATENT DOCUMENTS

| | | | |
|---|---|---|---|
| 2,101,388 | 12/1937 | Finley | 427/138 |
| 2,639,651 | 5/1953 | Scott | 427/417 |
| 2,987,410 | 6/1961 | Higgins et al. | |
| 2,987,410 | 6/1961 | Higgins et al. | |
| 3,024,130 | 3/1962 | Kish | 427/417 |
| 3,227,573 | 1/1966 | Axe et al. | 427/136 |
| 3,245,329 | 4/1966 | Nagin et al. | 427/139 |
| 3,261,269 | 7/1966 | McGovern | |
| 3,664,856 | 5/1972 | Evans et al. | |
| 3,801,341 | 4/1974 | Draper et al. | |
| 3,844,931 | 10/1974 | Ishiguro et al. | |
| 3,919,148 | 11/1975 | Winters et al. | |
| 4,003,959 | 1/1977 | Wada et al. | |
| 4,032,491 | 6/1977 | Schoenke | |
| 4,035,546 | 7/1977 | Ruppert, Jr. | |
| 4,124,550 | 11/1978 | Kobayashi et al. | |
| 4,177,079 | 12/1979 | Espenscheid | |
| 4,278,469 | 7/1981 | Yan et al. | |
| 4,537,635 | 8/1985 | Bart et al. | |
| 4,542,049 | 9/1985 | Tolburst et al. | |

FOREIGN PATENT DOCUMENTS

| | | | |
|---|---|---|---|
| 2250857 | 6/1975 | France | 427/138 |
| 598180 | of 1948 | United Kingdom | 427/417 |

OTHER PUBLICATIONS

Ernest W. Flick, "Industrial Solvents Handbook", 3rd Edition, pp. 59 and 60, ©1985.
Abrahams, "Asphalts and Allied Substances", pp. 49–63, 1963.
Ashland Oil Data Sheet No. 0004323-004.000, Aug. 28, 1986.
"McGraw-Hill Encyclopedia of Science and Technology", vol. 9, pp. 492 and 493, ©1966.
Ashland Oil Data Sheet No. 0004323-003, Oct. 1984.
Ashland Product Data, HI-SOL 10 (W), Aromatic Hydrocarbon, May 1978.
"Processing Notes Oil Industry Move Further into Aromatics", The Oil and Gas Journal, Jul. 3, 1961, pp. 116–117.
"How Will Producers of Coke-Oven Aromatics React to Competition?", Chemical Engineering, Jun. 26, 1961, p. 72.
"Chemical Markets for $C_8$–$C_9$–Aromatics", P. W. Sherwood, Industrial Chemist, Jan. 1964, pp. 25, 26 and 28.
"Petroleum Aromatics: From Specialty Operation to $350-million-a-year Industry in 10 Years . . . What's Ahead?", G. Adams et al, The Oil and Gas Journal, Sep. 4, 1961, pp. 171–172 & 174–175.
"Oil-Based Aromatics Gain First Place", R. F. Messing et al, Chemical Engineering, Dec. 26, 1960, pp. 50, 52–54, 56 & 60.

*Primary Examiner*—Terry J. Owens

[57] ABSTRACT

A novel composition for treating asphalt and concrete surfaces is provided formed of a mixture of topped coke oven tar, an aromatic solvent having an API Gravity@ 60° F. of 11-30, Specific Gravity 60°/60° F. of from 0.876–0.993. Distillation Range °F. of 310–450 IBP (initial boiling point) to 350–550 DP (dry point), and a Flash pt. °F. TCC of 110–250; and a bituminous pavement rejuvenator which is a composition derived from coal tar and comprises a mixture of di-, tri- and tetracyclic aromatic compounds and their alkyl homologs containing lower alkyl groups together with a significant amount of phenolic and hydroxy derivatives and having a specific gravity at 25°/25° C. of at least 1.08, an initial boiling point of at least 180° C., and a continuous boiling range to at least 300° C., 70–40% by volume of the material remaining as residue at 300° C., and the distillate to 300° C. having a minimum specific gravity at 25°/25° C. of about 1.025.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 3 and 4 is confirmed.
Claim 1 is determined to be patentable as amended.
Claim 2, dependent on an amended claim, is determined to be patentable.
New claims 5 and 6 are added and determined to be patentable.

1. A sealing and rejuvenating composition for bituminous and concrete surfaces comprising 40–60% by weight of topped coke oven tar having a float test of 50–300 seconds at 50° C., 20–35% by weight of an aromatic solvent having API Gravity at 60° F. of from 11–30, Specific Gravity 60/60°F. of from 0.876–0.933, IBP (initial boiling point) between 310 and 450, DP ([dye] *dry* point) of between 350 and 550, and a Flash pt. °F.TCC of from 110–250, and 15–35% by weight of a mixture of di-, tri- and tetracyclic aromatic compounds and their alkyl homologs containing lower alkyl groups together with 1–10% by weight of phenolic and hydroxy derivatives, said mixture being derived from the distillation of coal tar, said mixture having a specific gravity of 25/25° C. of at least 1.08 and an initial boiling point of at least 180° C., *a continuous boiling range to at least 300° C.,* with a distillation curve to 300° C., 70–40% of the material remaining as residue at 300° C., the distillate at 300° C. having a minimum specific gravity at 25/25° C. of about 1.025.

*5. A sealing and rejuvenating composition for bituminous and concrete surfaces consisting essentially of 40–60% by weight of topped coke oven tar having a float test of 50–300 seconds at 50° C., 20–35% by weight of an aromatic solvent having API Gravity at 60° F. of from 11–30, Specific Gravity 60/60° F. of from 0.876–0.993, IBP (initial boiling point) between 310 and 450, DP (dry point) of between 350 and 550, and a Flash pt. °F. TCC of from 110–250, and 15–35% by weight of a mixture of di-, tri- and tetracyclic aromatic compounds and their alkyl homologs containing lower alkyl groups together with 1–10% by weight of phenolic and hydroxy derivatives, said mixture being derived from the distillation of coal tar, said mixture having a specific gravity of 25/25° C. of at least 1.08 and an initial boil point of at least 180° C., with a distillation curve to 300° C., 70–40% of the material remaining as residue at 300° C., the distillate at 300° C. having a minimum specific gravity at 25/25° C. of about 1.025.*

*6. A method of sealing and rejuvenating bituminous and concrete surfaces which comprises applying to the surface at a rate of 0.05–0.5 gallon per square yard a composition consisting essentially of 40–60% by weight of topped coke oven tar having a float test of 50–300 seconds at 50° C. 20–35% by weight of an aromatic solvent having API Gravity at 60° F. of from 11–30, Specific Gravity 60/60° F. of from 0.876–0.993, IBP (initial boiling point) between 310 and 450, DP (dry point) of between 350 and 550, and a Flash pt. °F. TCC of from 110–250, and 15–35% by weight of a mixture of di-, tri- and tetracyclic aromatic compounds and their alkyl homologs containing lower alkyl groups together with 1–10% by weight of phenolic and hydroxy derivatives, said mixture being derived from the distillation of coal tar, said mixture having a specific gravity of 25/25° C. of at least 1.08 and an initial boiling point of at least 180° C., with a distillation curve to 300° C., 70–40% of the material remaining as residue at 300° C., the distillate at 300° C. having a minimum specific gravity at 25/25° C. of about 1.025.*

* * * * *